July 28, 1970  K. ZURELL  3,521,972
EQUIPMENT FOR THE INTRODUCTION OF GASES INTO FLUIDS
Original Filed May 31, 1966  3 Sheets-Sheet 2

INVENTOR
KARL ZURELL
BY Petherbridge, O'Neill & Aubel
ATTORNEYS

United States Patent Office
3,521,972
Patented July 28, 1970

3,521,972
EQUIPMENT FOR THE INTRODUCTION OF GASES INTO FLUIDS
Karl Zurell, Bad Swalbach, Germany, assignor to Passavant-Werke, near Michelbach, Nassau, Germany, a corporation of Germany
Continuation of application Ser. No. 554,178, May 31, 1966. This application Oct. 12, 1967, Ser. No. 674,987
Claims priority, application Germany, May 28, 1965,
P 36,927
Int. Cl. B01f 7/04
U.S. Cl. 416—134                                 1 Claim

ABSTRACT OF THE DISCLOSURE

A horizontally mounted rotor aerating sewage or waste liquid which includes a hollow shaft having a plurality of radially extending beater elements mounted thereon and shock absorbing coupling mounted within the hollow shaft.

---

The invention relates to aeration apparatus for introducing gases into fluids and, more particularly, to such apparatus for introducing oxygen into water by means of a rotor shaft equipped with shovels, paddles or similar beater elements.

The present invention is based on the earlier filed German patent application No. 36,927, filed on May 28, 1965 and claims the benefit of the said filing date. The present invention is related to application Ser. No. 553,763 entitled Equipment for the Introduction of Gases Into Fluids now Pat. No. 3,458,176 and to application Ser. No. 554,179 entitled Support of Rotor now abandoned.

This application is a continuation of Ser. No. 554,178 filed May 31, 1966 and now abandoned.

In aeration apparatus of types heretofore known, when the shovels or beater elements are passing through the fluid, suction turbulence is created for the purpose of introducing and distributing air in the form of fine bubbles into the fluid. A large volume of gas may thus be introduced into and absorbed by the fluid. Such action is particularly useful for introducing oxygen into water for treating sewage.

The efficiency of prior art aeration rotors depends on the immersion depth of the shovels and the speed at which the shovels are passed through the fluid. However, the depth to which the shovels can be immersed is limited; if the shovels are immersed too deeply the effective speed of the shovel on the fluid surface becomes too low to produce the type of bubbles required. Further, shovels which are immersed too deeply or are of a long length are subject to excessive stresses.

It has, heretofore, been common practice to position the rotor shaft, bearings and couplings as far as possible from the water surface in order to decrease the exposure of the various rotor parts to corrosion and thus increase the longevity of trouble-free rotor operation; corrosion becomes even more of a problem where the fluid being treated contains sewage.

For the foregoing reasons, aeration rotors previously known have been of relatively small dimensions. The prior art considered that in view of the limited depth to which the shovels can be immersed increasing the length of the shovels would bring about increased costs with no attendant advantages. According to the teachings of the prior art, the foregoing conclusion would be correct, if only a proportional increase of the immersion depth or of the shovel length were to be considered.

Accordingly, it is a principal object of the present invention to provide an improved aeration apparatus for introducing gases into fluids wherein the diameter of the rotor shaft of the aeration rotor is hollow and is more than one-quarter, preferably 30 to 40% of the total diameter of the aeration rotor.

Rotors, according to the present invention, can be produced with considerably larger diameters than the rotors previously known because the shovel length does not require an extension; and, therefore, the shovels are not subject to excessive stress. Thus, rotors constructed in accordance with the invention have a higher efficiency when compared with prior art rotors having similar shovel lengths and immersion depths. The foregoing is due to the fact that the larger radius of the inventive rotor permits the shovels to operate at a relatively higher speed at the water surface. In addition, in the inventive rotor, a steady circumferential speed; that is, a steady moving speed of the shovels through the water, may be provided with a relatively low torque. This latter feature is of importance mainly with respect to the durability of the apparatus.

Surprisingly, it was also found that, with a rotor shaft of large diameter in accordance with the invention, it was no longer necessary to position the rotor shaft at a maximum distance from the water surface. The large diameter rotor shaft of the invention can be better supported and better coupled to the drive motor since it enables bearings and couplings to be used which can better resist pollution. Moreover, if a rotor shaft of large diameter is chosen, the length of the rotor, as compared to the prior art devices, can be considerably increased and hence less bearings and couplings are necessary.

For the reasons mentioned, in prior known aeration rotors the shovels are mounted on a relatively thin rotor shaft. Heretofore, the maximum axial length of rotor shafts employed was three meters, since it was found that in shafts of longer lengths the stress resulting from continuous operation would become excessive. In general, therefore, to suitably aerate a given amount of fluid, several of these rotors were positioned in spaced relation to operate on the liquid surface which again has the disadvantage of requiring a great number of couplings and bearings.

It is, accordingly, another object of the invention to provide aeration rotors having an axial length of 4.5 meters to ten meters and a diameter of about one meter. Rotors having long axial length are capable of extending across very wide aeration basins so that only one terminal bearing and one drive coupling is necessary. Rotors having lengths of six meters to 7.5 meters have been found to be particularly useful.

It is another object of the invention to provide a hollow rotor shaft and means for mounting the drive coupling for the rotor shaft in the interior of the hollow shaft. It has been found that mounting of the above coupling in the shaft can be accomplished in a simple manner by forming the drive coupling in segments provided with an elastic layer. Inner segments of the drive coupling are joined with an axle spigot or hub and the outer segments of the drive coupling engage the interior of the hollow shaft. Mounting of the drive coupling in the interior of the hollow shaft thus protects the coupling, as far as possible, against external influences. The coupling includes an elastic layer which enables the starting thrust and torsional waves of the equipment to be reduced, and to compensate for any unevenness due to settling of the support foundation, installation defects, etc.

Further, in accordance with the invention, the connection of the coupling to the hollow shaft can be positioned to lie in the plane where the turning point of the coupling is situated. In this manner a very durable and fault-resistant drive, even for very large rotors, is guaranteed.

It has been found advantageous to position the drive motor above the gearing for the rotor shaft drive to obtain a space-saving arrangement. In accordance with the invention, it is possible to position two rotors one on either side of the drive motor and the associated gearing; and, dependent on the gearing applied, drive the rotors in the same or opposite direction. When the aeration apparatus is used for aeration basins, in which water is circulated around a horizontal axis, generally rotors with similar rotation and positioned to operate in two adjacent basins will be applied. When the aeration apparatus is used in circulation systems, rotors with opposite rotation can be used. In this latter case a single drive assembly and an aeration rotor located on a central separation wall of, for example, a six millimeter wide ditch can provide a desired circulation pattern.

The foregoing and other objects, features and advantages of the invention will be apparent from the following more particular description of the preferred embodiments of the invention, as illustrated in the accompanying drawings wherein.

Figure 1:
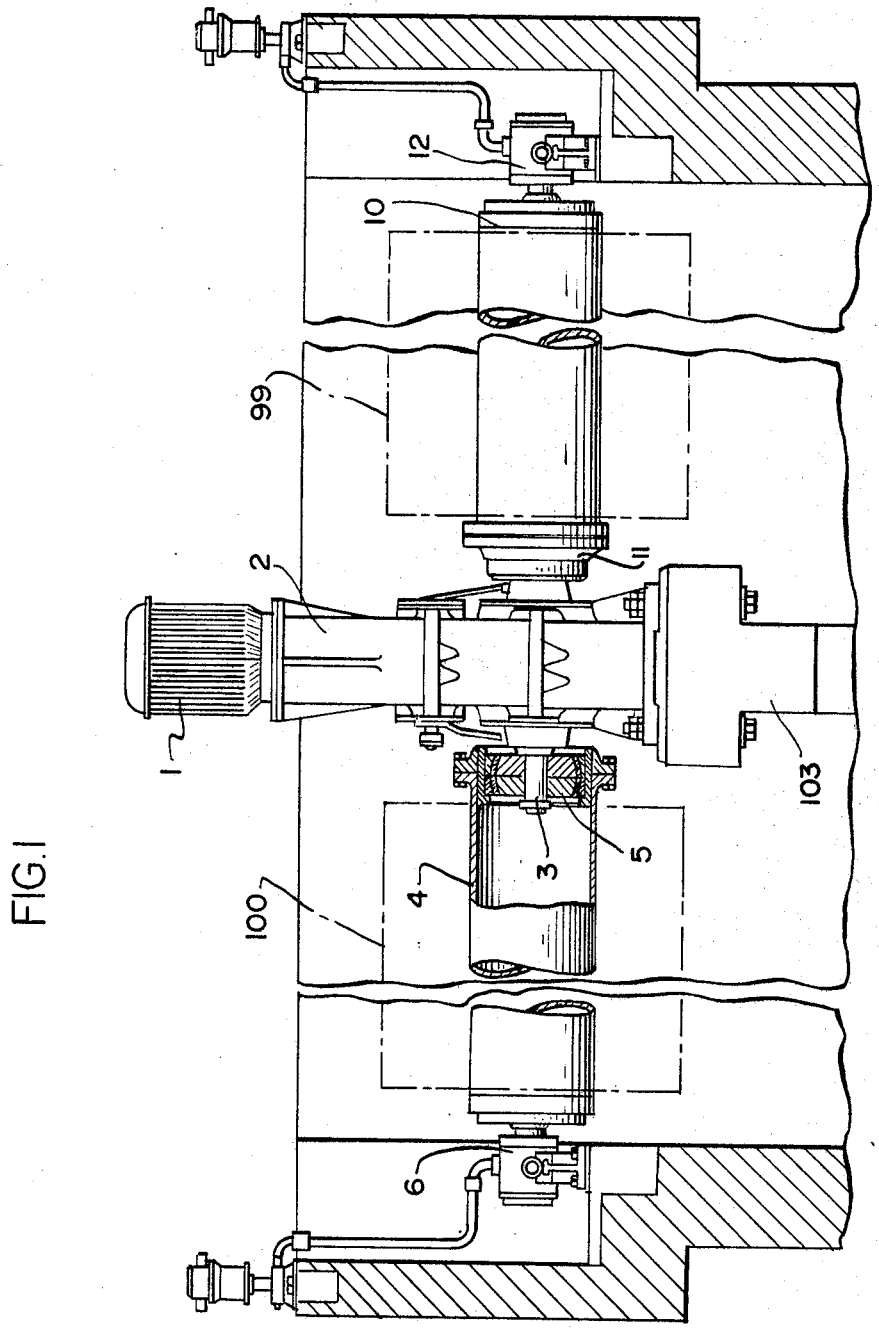
FIG. 1 is a view of an overall aeration apparatus in accordance with the invention.
Figure 2:
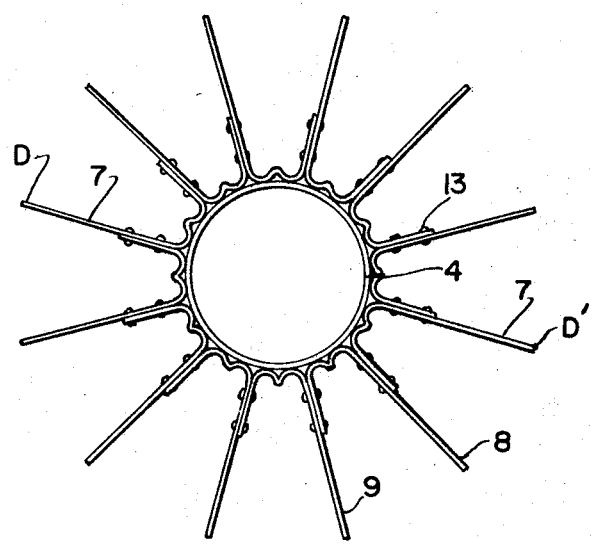
FIG. 2 is a section through an aeration rotor in accordance with the invention.

Refer first to FIG. 1. A motor 1 which is mounted on a column 2 drives an aeration rotor 100 through a gearing, not shown, also mounted in the column 2. The gearing connects to an axle spigot or hub 3 which is affixed to a hollow shaft 4 through a coupling unit 5. At its other end, the shaft 4 rests in a terminal bearing 6. As shown in FIG. 2, the hollow shaft is furnished with aeration shovels 7, 8, 9, etc., of any suitable known type.

Separate motors, similar to motor 1, may be used to drive respective aeration rotors when only a single basin is to be aerated. In such cases the terminal bearing 6, column 2 with the motor 1 and the gearing are mounted on one of the basin walls.

However, as shown in FIG. 1, it is also possible to drive two similar aeration rotors 100 and 99 by one single motor 1. The aeration rotor 99 also has a hollow shaft 10 which is connected to the motor drive gearing through a hub and coupling unit 11, similar respectively to hub 3 and coupling unit 5 of rotor 100. The other end of the shaft 10 rests in a terminal bearing 12. The aeration rotor 99 is furnished with aeration shovels similarly as rotor 100, and bearing 12 is similar to bearing 6.

Figure 4:
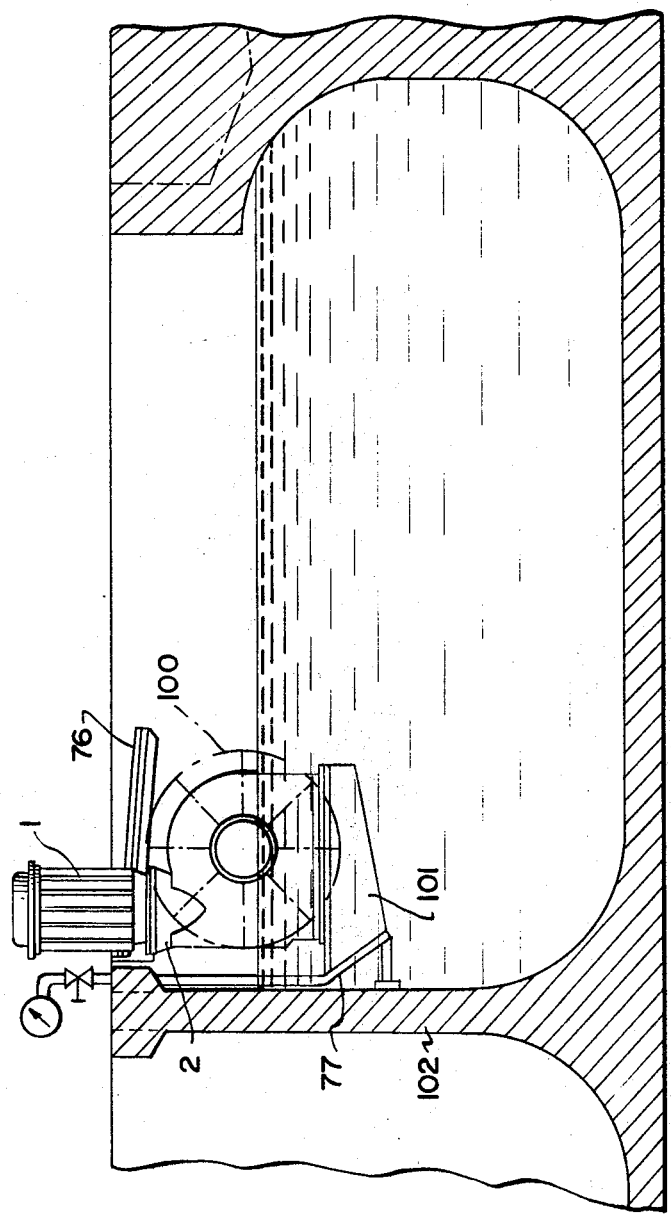
FIG. 4 is a section through an aeration basin showing an aeration apparatus in accordance with the invention mounted on a wall of the basin.

It has been found that with rotors having lengths of, for instance, six meters each, it is possible to aerate basins of over 12 meters in width. In one embodiment, the column 2 and motor 1 can be arranged on a ledge or support 101 formed at the back wall of the basin 102 (FIG. 4). Alternatively, the aeration basins can also be arranged adjacent to one another, and column 2 can be arranged on an intermediate wall 103 (FIG. 1) between the sections of a circulation ditch. As mentioned hereinabove, the hollow shaft can be driven in a similar or opposite direction, according to their desired purpose of use and dependent on the gearing applied.

Refer now to FIG. 2. The hollow shaft 4 has a diameter which exceeds one-quarter of the total diameter of the aeration rotor 100; that is, the length measured from the tip labeled D of a shovel 7 to the tip labeled D' of a diametrically opposed shovel. The diameter of the hollow shaft can advantageously be 300 to 400 millimeters; and, in one particular embodiment the shaft is 350 millimeters in diameter. The length of the aeration shovels then is preferably 300 to 400 millimeters; and, in one embodiment the shovels were 325 millimeters in length. In this manner a total diameter of about 1000 millimeters can be obtained. At a diameter of 1000 millimeters, a relatively low torque is sufficient to drive the rotor at a sufficiently high circumferential speed for the introduction of the required oxygen quantity into the fluid. The immersion depth can advantageously be 250 to 300 millimeters, far more than for prior known rotors. Further, aeration rotors having axial lengths of six to ten meters can be conveniently made and operated. Also, if necessary, aeration rotors having even longer axial lengths could be made.

The aeration rotors can be provided with V-shaped curved band irons (FIG. 2) which are connected with each other at 13 and so form the shovels or beater elements 7 to 9. Other types of beater elements can likewise be employed; for example, star-shaped, casted pieces with suitable shovels can be inserted into the hollow shaft 4. It will be appreciated that the structure of the present invention enables a greater immersion depth to be obtained; it permits the shovel width to be increased; and permits the distance or spacing between the shovels to be made smaller than in the prior art, all of which features tend to increase the aeration effect. Further, in the structure of the present invention, shovels provided with openings or perforated shovels can be successfully utilized.

Figure 3:
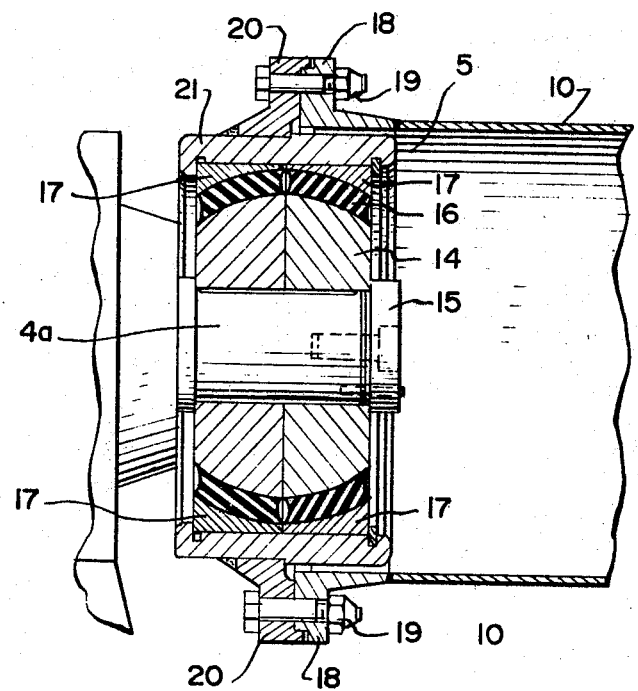
FIG. 3 is a section through a coupling unit or assembly of the aeration rotor.

Refer now particularly to FIGS. 1 and 3. The coupling unit 5 mounted within the hollow shaft 4 is connected with the axle spigot or hub 3 of the gearing of motor 1. The coupling 5 includes inner segments 14 which are fastened on the axle spigot 3, as by a disc 15. These segments 14 are connected by means of an elastic or resilient layer 16 to the outer segments 17. The segments 17 are positioned within ring 21 and operatively engage the ring 21. A flange 18 formed on the hollow shaft 4 is connected by a screw 19 with a flange 20, which is affixed on a ring or cylinder 21. The axle spigot 3 is thus operatively connected in the hollow shaft 4.

As mentioned hereinabove, coupling unit 11, associated with rotor shaft 10 of aeration rotor 99, is similar to coupling 5. It can be appreciated that coupling units 5 and 11 have the advantage of being mounted within the hollow shafts 4 and 10 and hence are, as far as possible, protected against pollution and corrosion.

The spherical elastic layer 16, which preferably consists of a rubber material, is pre-tensioned and vulcanized on respective sides to the segments 14 and 17 to provide further important advantages. Firstly, the rubber layer provides a shock absorbing turning give or cushioning effect of about seven degrees, dependent on the hardness and volume of the rubber layer. The rubber layer thus reduces or compensates for the starting thrusts and torsional waves effective on the rotor shaft and, hence provides shock protection to the aeration apparatus and its drive. Also, the coupling in accordance with the invention compensates for any settling of the rotor support foundation and possible installation defects. The latter mentioned feature is also due, in part, to the fact that connection of the drive with the hollow shaft 4 is effected in a plane where the turning or driving point of the coupling is located.

In FIG. 4 a pressure aeration apparatus 77 shows that the aeration equipment in accordance with the invention can, if necessary, be operated in conjunction with other means for introducing compressed air to the fluid. Also, in FIG. 4 a cover 76 is provided for the rotor shaft. The cover 76 may be of corrugated steel plate which is a corrosion resistant material. While the cover 76 is shown extending only over the top of the aeration rotor 100, it may also be constructed and arranged to extend down the front side of the aeration rotor 100.

While the invention has been particularly shown and described with reference to preferred embodiments thereof, it will be understood by those skilled in the art that various changes in form and details may be made therein without departing from the spirit and scope of the invention.

I claim:
1. A rotor for aeration apparatus comprising, in combination:
 (a) a hollow shaft
 (b) a plurality of radially extending beater elements mounted in spaced relation thereon;
 (c) said shaft being of a diameter which is 30% to 40% of the total diameter of said aeration rotor measured from the outer end of one beater element to the outer end of a diametrically opposed beater element; and
 (d) a coupling for driving said rotor mounted within the interior of said hollow shaft comprising a plurality of segments arranged as an inner and outer group of segments, said inner segments being connected to the axle hub of an associated drive, said outer group of segments being mounted to engage said hollow shaft; and an elastic layer positioned between said inner and outer groups of segments, whereby said elastic layer provides a shock absorbing cushion to thereby reduce the effect of starting thrust and torsional waves.

References Cited

UNITED STATES PATENTS

| 1,646,351 | 10/1927 | Mier | 259—136 |
| 3,109,875 | 11/1963 | Schramm | 261—92 |

ROBERT W. JENKINS, Primary Examiner

U.S. Cl. X.R.
259—103; 261—92